United States Patent
Chen et al.

(10) Patent No.: US 9,632,600 B2
(45) Date of Patent: Apr. 25, 2017

(54) SPRINGS TO APPLY A PRELOADING FORCE TO A PRESSURE SENSOR AND TO COMPRESS IN RESPONSE TO A COMPRESSING FORCE APPLIED BY A STYLUS TIP PORTION

(71) Applicant: Hewlett-Packard Development Company, L.P., Houston, TX (US)

(72) Inventors: Shan-Chih Chen, Taipei (TW); Wei Jen Chen, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 14/589,991

(22) Filed: Jan. 5, 2015

(65) Prior Publication Data
US 2016/0195942 A1 Jul. 7, 2016

(51) Int. Cl.
*G06F 3/0354* (2013.01)
*G06F 3/033* (2013.01)

(52) U.S. Cl.
CPC .......... *G06F 3/03545* (2013.01); *G06F 3/033* (2013.01); *G06F 2203/04108* (2013.01)

(58) Field of Classification Search
CPC ................. G06F 3/03545; G06F 3/033; G06F 2203/04108
See application file for complete search history.

(56) References Cited

U.S. PATENT DOCUMENTS

2013/0271431 A1* 10/2013 Besperstov ............. G06F 3/033
345/179
2013/0321359 A1 12/2013 Zeliff
2014/0165742 A1 6/2014 Fergusson
2015/0109239 A1* 4/2015 Mao ..................... G06F 3/03545
345/174

FOREIGN PATENT DOCUMENTS

CN 2596421 12/2006
WO WO-2013160887 10/2013
WO WO-2014073745 5/2014

* cited by examiner

*Primary Examiner* — Jimmy H Nguyen
*Assistant Examiner* — Yaron Cohen
(74) *Attorney, Agent, or Firm* — HP Patent Department

(57) ABSTRACT

Example embodiments relate to stylus. For example, a stylus includes a pressure sensor and a sensor holder in contact with the pressure sensor. The stylus also includes a first spring having a distal end and a proximal end. The distal end is in contact with the sensor holder. The stylus further includes a spring holder in contact with the proximal end. The stylus further includes a second spring in contact with the sensor holder to apply a preloading force to the pressure sensor. The entirety of the spring holder and a portion of the first spring are positioned within the second spring. The stylus further includes a tip portion in contact with the spring holder to compress the first spring in response to a compressing force applied to the tip portion.

20 Claims, 2 Drawing Sheets

SPRINGS TO APPLY A PRELOADING FORCE TO A PRESSURE SENSOR AND TO COMPRESS IN RESPONSE TO A COMPRESSING FORCE APPLIED BY A STYLUS TIP PORTION

BACKGROUND

An electronic device with a touch-sensitive display, such as a tablet computing device, may enable a user to input commands by directly making contact with the touch-sensitive display. A user may use different input tools to make contact with the touch-sensitive. display. For example, an input tool may be a stylus.

BRIEF DESCRIPTION OF THE DRAWINGS

Some examples of the present application are described with respect to the following figures.

DETAILED DESCRIPTION

A stylus may be shaped similar to a pen and may include a tip to emulate a user's finger. One type of stylus is active stylus. An active stylus is a stylus that includes electronic components to provide input data to an electronic device having a touch-sensitive display. An example electronic component may be a pressure sensor. The pressure sensor may be coupled to a tip of the stylus to generate pressure data corresponding to an amount of force or pressure applied to the tip. The pressure data may be used in a plurality of operations. For example, when a controller of the stylus determines that the amount of pressure is above a threshold based on the pressure data, the stylus may transmit input data with pressure data to the electronic device. When the amount of pressure is not above the threshold, the stylus may transmit input data but without pressure data to the electronic device. The pressure data may inform the electronic device whether the stylus is in contact with the touch-sensitive display. However, when a stylus is dropped accidentally, the tip may be pushed back with a large amount of force that damages the pressure sensor. Thus, a likelihood of damaging the pressure sensor may be increased.

Examples described herein provide a stylus that includes a spring to provide dampening for a pressure sensor of the stylus. For example, a stylus may include a pressure sensor and a sensor holder in contact with the pressure sensor. The stylus may also include a first spring having a distal end and a proximal end. The distal end may be in contact with the sensor holder. The stylus may further include a spring holder in contact with the proximal end. The stylus may further include a second spring in contact with the sensor holder to apply a preloading force to the pressure sensor. The entirety of the spring holder may be positioned within the second spring and a portion of the first spring may be positioned within the second spring. The stylus may further include a tip portion in contact with the spring holder to compress the first spring in response to a compressing force applied to the tip portion. In this manner, examples described herein may reduce a likelihood of damaging the pressure sensor.

Figure 1:
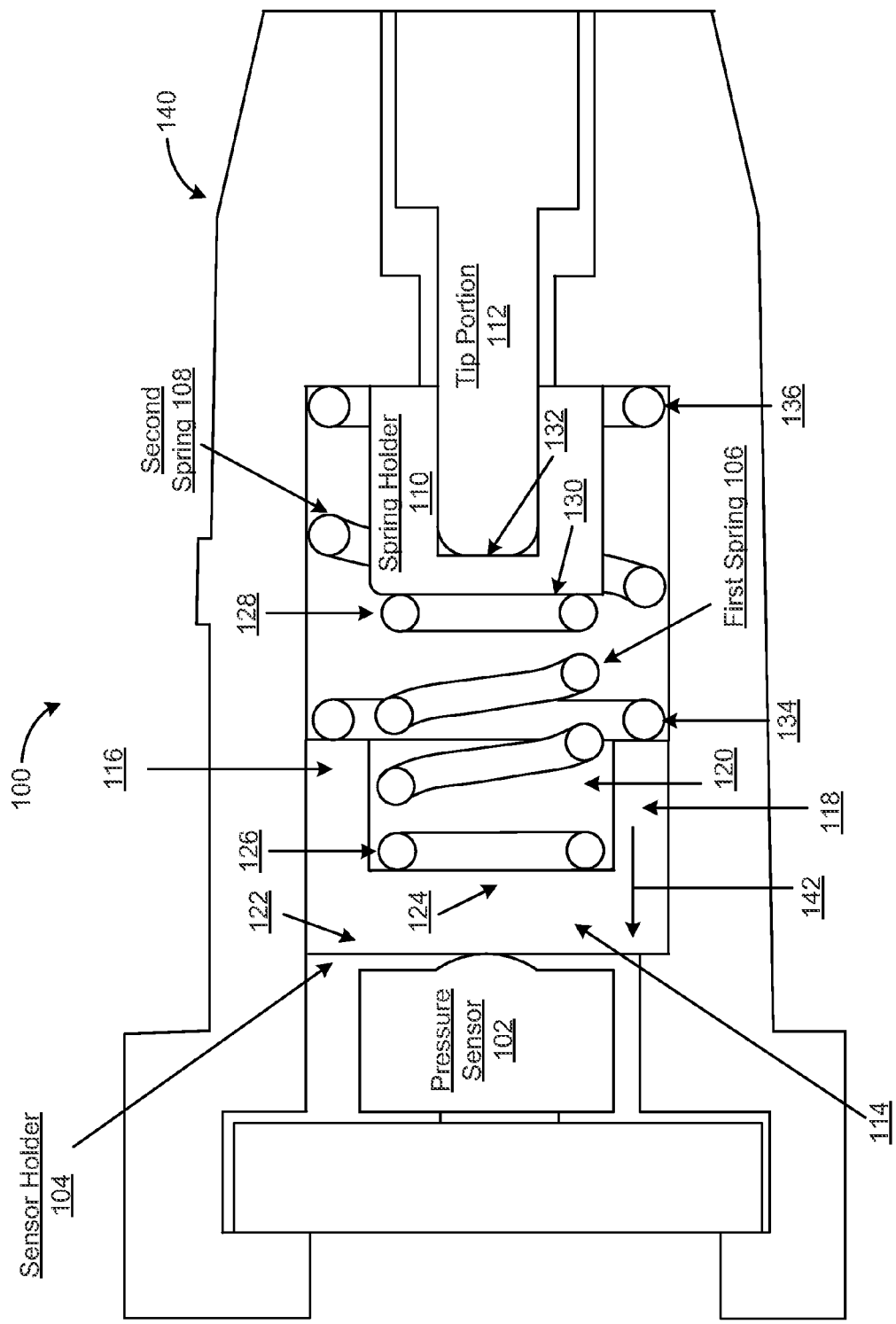
FIG. 1 is a cross section of a stylus with multiple springs, according to an example.

Referring now to the figures, FIG. 1 is a cross section of a stylus 100 with multiple springs, according to an example. Stylus 100 may be an active stylus. Stylus 100 may include a pressure sensor 102, a sensor holder 104, a first spring 106, a second spring 108, a spring holder 110, and a tip portion 112.

Pressure sensor 102 may be any electronic device or circuit that measures pressure. In some examples, pressure sensor 102 may be implemented using a force-sensitive resistor. Springs 106 and 108 may be coil springs. Sensor holder 104 may include a body portion 114, a first tab portion 116, and a second tab portion 118. Tab portions 116 and 118 may extend from body portion 114 to define a recess 120.

Pressure sensor 102 may be in contact with a first side 122 of body portion 114. A second side 124 of body portion 114, opposite to first side 122, may be in contact with a distal end 126 of first spring 106. Distal end 126 may be positioned within recess 120. Thus, sensor holder 104 may be positioned between pressure sensor 102 and first spring 106. A proximal end 128 of first spring 106 may be in contact with a first side 130 of spring holder 110. A tip portion 112 may be in contact with a second side 132 of spring holder 110 that is opposite to first side 130. Thus, spring holder 110 may be positioned between first spring 106 and tip portion 112.

A distal end 134 of second spring 108 may be in contact with tab portions 116 and 118. A proximal end 136 of second spring 108 may be in contact with a tip housing 140. Tip housing 140 is described in more detail in FIG. 2. Thus, second spring 108 may be positioned between sensor holder 104 and tip housing 140. The weight of sensor holder 104 and pressure sensor 102 may be supported by second spring 108 so that second spring 108 may provide a preloading force to pressure sensor 102 via sensor holder 104 (as indicated by an arrow 142), Second spring 108 may have a greater diameter than first spring 106 such that a portion of first spring 106, such as proximal end 128 of first spring 106, may be positioned within second spring 108. Further, the diameter of second spring 108 may enable the entirety of spring holder 110 may be positioned within second spring 108. As described in more detail in FIG. 2, first spring 106 may provide dampening to pressure sensor 102 when tip portion 112 is pushed towards pressure sensor 102.

Figure 2:
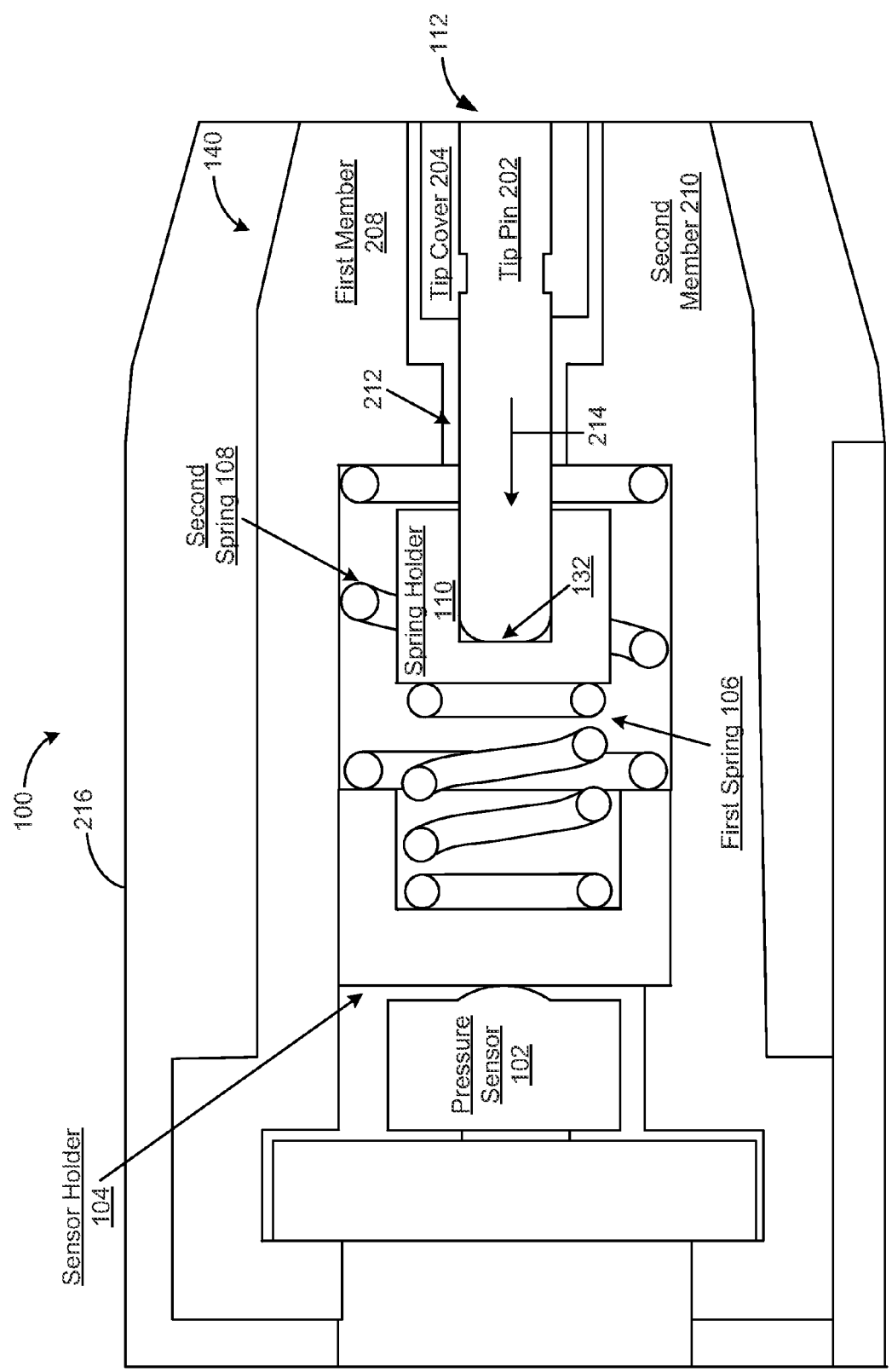
FIG. 2 is a cross section of the stylus of FIG. 1, according to another example.

FIG. 2 is a cross section of stylus 100 of FIG. 1, according to another example. In some examples, tip portion 112 may include a tip pin 202 that is elongated and is in contact with second side 132 of spring holder 110. Tip portion 112 may also include a tip cover 204 coupled to tip pin 202. Tip housing 140 may include a first member 208 and a second member 210. Members 208 and 210 may define a channel 212. Tip pin 202 may be moveable within channel 212. In some examples, pressure sensor 102, sensor holder 104, first spring 106, spring holder 110, and second spring 108 may be positioned within tip housing 140. Tip housing 140 may be positioned within a housing 216 of stylus 100 that defines the shape of stylus 100. In some examples, stylus 100 may also include electronic components (not shown in FIG. 2) to communicate with an electronic device having a touch-sensitive display via wireless or wired communication.

Pressure sensor 102 may detect a portion of a compressing force (as indicated by an arrow 214) applied to tip portion 112, such as when tip portion 112 is pressed on a touch-sensitive display or make contact with a hard surface when stylus 100 is dropped. Based on the detection of the portion of the compressing force, pressure sensor 102 may generate pressure data corresponding to the amount of the detected compressing force. In response to an application of the compressing force, tip portion 112 may move towards pressure sensor 102 via a channel 212. In particular, tip pin 202 may compress first spring 106 via spring holder 110 to transfer the compressing force to pressure sensor 102 via sensor holder 104. The compression of first spring 106 may absorb a portion of the compressing force while the remaining portion of the compressing force is measured/detected by pressure sensor 102. Thus, first spring 106 may provide dampening to pressure sensor 102 to reduce a likelihood of damaging pressure sensor 102 during a drop of stylus 100. During the application of the compressing force, second spring 108 may be unaffected by the compressing force. Thus, second spring 108 may be uncompressed.

The use of "comprising", "including" or "having" are synonymous and variations thereof herein are meant to be inclusive or open-ended and do not exclude additional unrecited elements or method steps.

What is claimed is:

1. A stylus comprising:
    a pressure sensor;
    a sensor holder in direct contact with the pressure sensor;
    a first spring including a distal end and a proximal end, wherein the distal end is in direct contact with the sensor holder;
    a spring holder in direct contact with the proximal end;
    a second spring in direct contact with the sensor holder to apply a preloading force to the pressure sensor, wherein the entirety of the spring holder is positioned within the second spring, and wherein a portion of the first spring is positioned within the second spring; and
    a tip portion in direct contact with the spring holder to compress the first spring in response to a compressing force applied to the tip portion.

2. The stylus of claim 1, further comprising a tip housing defining a channel, wherein a tip pin of the tip portion is moveable within the channel.

3. The stylus of claim 1, wherein the pressure sensor, the sensor holder, the first spring, the spring holder, and the second spring are disposed within the tip housing.

4. The stylus of claim 1, the first spring to absorb a portion of the compressing force.

5. The stylus of claim 1, wherein the tip portion includes a tip pin in contact with spring holder, and wherein the tip portion also includes a tip cover molded over the tip pin.

6. The stylus of claim 1, further comprising a housing, the second spring in contact with the housing and supporting a weight of the sensor holder and the pressure sensor.

7. The stylus of claim 6, wherein the preloading force applied by the second spring to the pressure sensor is along a longitudinal axis of the stylus.

8. The stylus of claim 1, wherein the second spring has a larger diameter than a diameter of the first spring, the second spring comprising an inner bore, and the portion of the first spring received in the inner bore of the second spring.

9. The stylus of claim 8, wherein the spring holder is entirely located inside the inner bore of the second spring.

10. The stylus of claim 8, wherein the proximal end of the first spring touches the spring holder inside the inner bore of the second spring.

11. The stylus of claim 1, wherein the spring holder is separate from the tip portion.

12. A stylus comprising:
    a pressure sensor;
    a sensor holder including:
        a body portion, wherein a first side of the body portion directly touches the pressure sensor; and
        a tab portion extending from the body portion;
    a first spring including a distal end and a proximal end, wherein the distal end directly touches a second side of the body portion;
    a spring holder directly touching the proximal end;
    a second spring directly touching the tab portion of the sensor holder to apply a preloading force to the pressure sensor along a longitudinal axis of the stylus, wherein the entirety of the spring holder is positioned inside an inner bore of the second spring, and wherein the proximal end of the first spring is positioned inside the inner bore of the second spring; and
    a tip portion directly touching the spring holder to compress the first spring in response to a compressing force applied to the tip portion.

13. The stylus of claim 12, further comprising a tip housing defining a channel, wherein a tip pin of the tip portion is moveable within the channel.

14. The stylus of claim 12, the first spring to absorb a portion of the compressing force.

15. The stylus of claim 12, wherein the pressure sensor is a force-sensitive resistor.

16. The stylus of claim 12, wherein a diameter of the second spring is larger than a diameter of the first spring.

17. The stylus of claim 16, wherein an entire length of the spring holder fits within the inner bore of the second spring.

18. A method comprising:
    physically directly contacting a pressure sensor to a first side of a sensor holder;
    physically directly contacting a distal end of a first spring to a second side of the sensor holder;
    physically directly contacting a spring holder to a proximal end of the first spring;
    physically directly contacting a second spring to the sensor holder to apply a preloading force to the pressure sensor;
    arranging the entirety of the spring holder inside an inner bore of the second spring;
    arranging the proximal end of the first spring inside the inner bore of the second spring; and
    physically directly contacting a tip portion to the spring holder to compress the first spring in response to a compressing force applied to the tip portion.

19. The method of claim 18, wherein the first spring absorbs a portion of the compressing force.

20. The method of claim 18, wherein the pressure sensor is a force-sensitive resistor.

* * * * *